J. T. CULLEN, Jr.
WATER HEATER.
APPLICATION FILED AUG. 19, 1911.
1,039,651.
Patented Sept. 24, 1912.
2 SHEETS—SHEET 1.
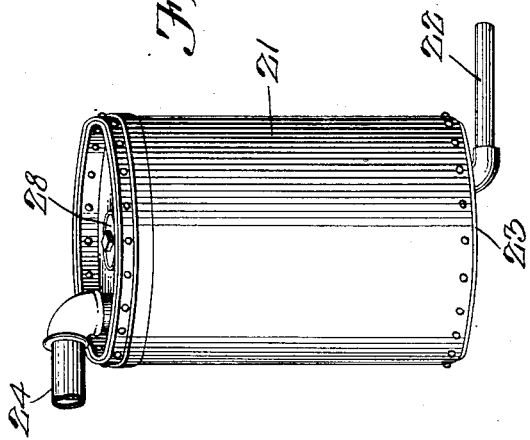
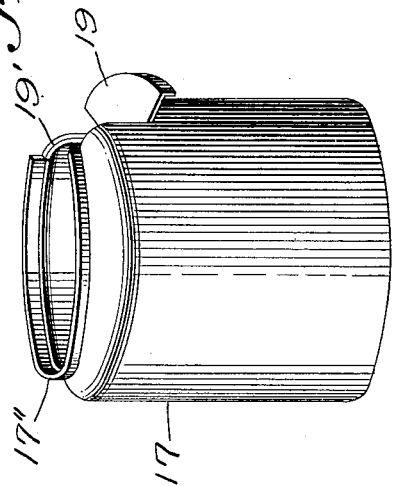
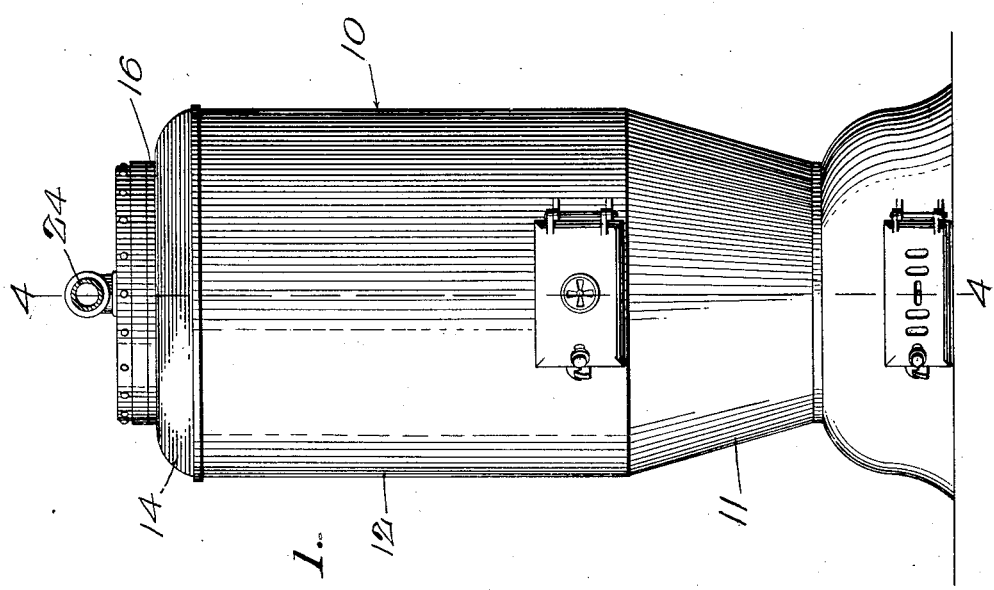
Witnesses
John T. Cullen Jr.
Inventor
by C. A. Snow & Co.
Attorneys J. T. CULLEN, Jr.
WATER HEATER.
APPLICATION FILED AUG. 19, 1911.
1,039,651.
Patented Sept. 24, 1912.
2 SHEETS—SHEET 2.
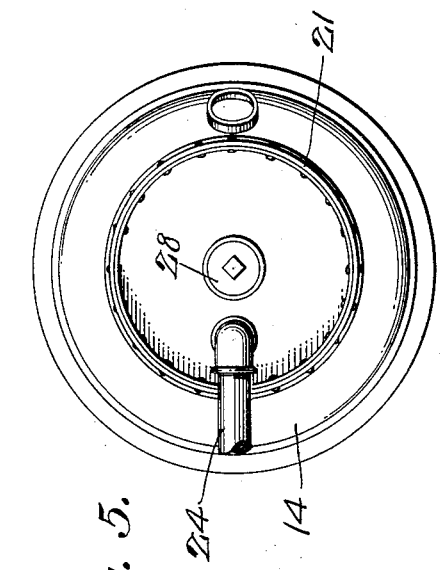
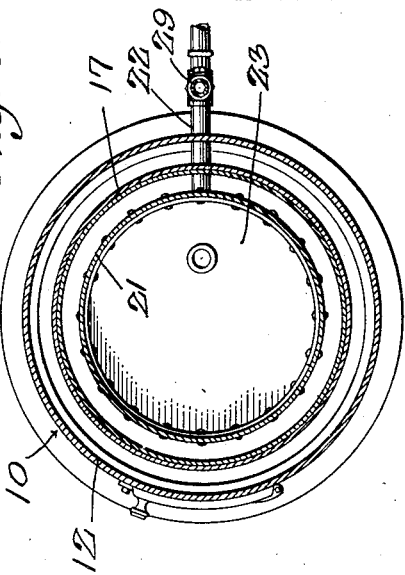
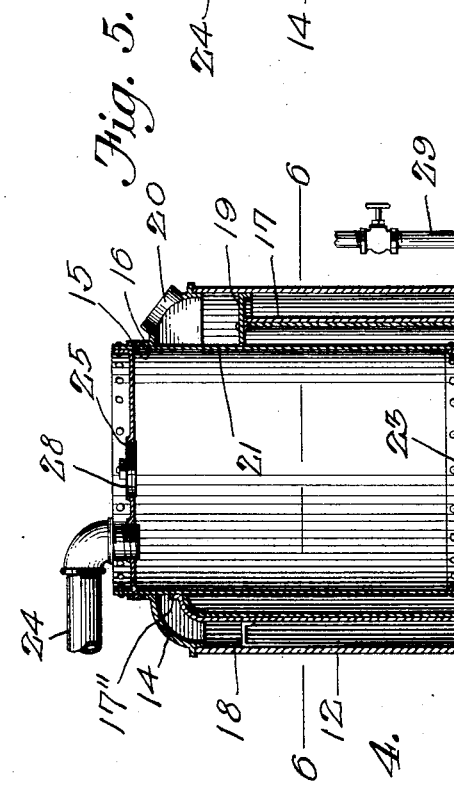
John T. Cullen Jr.
Inventor
Witnesses
by C. A. Snow & Co.
Attorneys

UNITED STATES PATENT OFFICE.

JOHN T. CULLEN, JR., OF CLINTON, IOWA.

WATER-HEATER.

1,039,651.  Specification of Letters Patent.  Patented Sept. 24, 1912.

Application filed August 19, 1911. Serial No. 644,980.

*To all whom it may concern:*

Be it known that I, JOHN T. CULLEN, Jr., a citizen of the United States, residing at Clinton, in the county of Clinton and State of Iowa, have invented a new and useful Water-Heater, of which the following is a specification.

This invention relates to an improvement in water heaters.

The primary object of said invention is to provide a water heater which may be conveniently arranged within a stove or furnace and which will be simple in construction and economical to manufacture.

A further object of the invention is to provide means for supporting the water receptacle which contains the water to be heated within the furnace, said means performing the double function of a support and a heat retainer.

In the drawings—Figure 1 is a front elevation of a furnace equipped with the improved heater. Fig. 2 is a perspective view of the water tank removed. Fig. 3 is a perspective view of the heat retaining jacket. Fig. 4 is a section taken on the line 4—4 of Fig. 1. Fig. 5 is a top plan view on the line 5—5 of Fig. 4, and Fig. 6 is a section taken on the line 6—6 of Fig. 4.

In the drawings 10 designates the furnace which may be of the usual type and which is provided with a fire box 11 and the cylindrical upper portion 12. The top or head 14 of the furnace (which in furnaces of the type shown is removable) is provided with an opening 15, said top being formed with the upstanding flange or collar 16 adjacent said opening. Supported within the upper portion of the furnace is a heat retaining jacket shown in Fig. 3 which is supported by means of a bracket 18 and a baffle plate or deflector 19, the deflector 19 being directly below an opening 20 through which the furnace gases pass, the jacket 17 being bolted to said baffle plate. The inner wall of the jacket or hood is lined with asbestos. Arranged to extend within the jacket is the cylindrical tank or water receptacle 21, the opening 15 in the furnace being slightly in excess of the diameter of the said receptacle, the jacket 17 being of a diameter in excess of the cylinder 21, said member 17 being provided with the reduced cylindrical extension 17″ which closely hugs the cylinder 21, the member 17 and its extension 17″ being broken away at 19′, a portion of the cylinder being bent inwardly at this point and bolted to the baffle plate 19 which is so positioned as to prevent the smoke and gases from passing directly from the fire box to the opening 20. It will thus be noted that the heat will be held between the walls of the cylinder 21 and the inner walls of the jacket 17, thus effectually heating the cylinder 21, the peculiar arrangement of the cylinder 17 and the baffle plate in no way restricting the opening 20 in the top of the furnace to effect the draft. A water intake pipe 22 extends within the lower end 23 of the cylinder 21 and an outlet pipe 24 extends within its upper end, said upper end being provided with the centrally disposed aperture 25 which is closed by means of a plug 28, the interior of the tank or boiler being inspected through this aperture 25. The pipe 22 is connected to a second pipe 29 which supplies the water to the system, said pipe 22 being provided with a valve 29′ for draining the system.

In the application of the invention as shown in the drawings one or more radiators are arranged between the cold water inlet and the hot water outlet and it will be seen that as the water is heated in the tank 21, the same will rise passing through outlet 24, returning for reheating through the intake 22.

Attention is called to the peculiar manner of suspending the tank within the furnace and the way in which said support forms a heat retaining jacket. It will be noted that the entire apparatus may be readily positioned within the ordinary type of furnace without materially altering its construction and that all of the parts may be cheaply and conveniently manufactured.

While the apparatus is shown in connection with a heating system it will be understood that the receptacle 21 may be used to heat water for various purposes and in instances where a constant circulation is not provided the tank may be provided with a water gage the operation of the heating apparatus being the same as when the device is used in connection with a heating system. It will also be noted that instead of the apparatus being used as a hot water heating system, the same may also be used as a steam heating system.

What is claimed is:—

A water heater consisting of a tank extended within a furnace, a heat retaining jacket, the walls of said jacket being spaced from the tank, said jacket being provided with a reduced annular extension embracing said tank, a baffle plate, said plate being formed with a flange, said flange being secured to the wall of said furnace, the edge of said plate remote from said flange contacting with said tank, said jacket being cut away adjacent said baffle plate, and a flange formed integral with said jacket and secured to said plate.

In testimony that I claim the foregoing as my own, I have hereto affixed my signature in the presence of two witnesses.

JOHN T. CULLEN, Jr.

Witnesses:
L. E. CULLEN,
J. T. CULLEN.

Copies of this patent may be obtained for five cents each, by addressing the "Commissioner of Patents, Washington, D. C."